United States Patent

[11] 3,557,346

[72] Inventor Ronald William Lomax
London, England
[21] Appl. No. 675,235
[22] Filed Oct. 13, 1967
[45] Patented Jan. 19, 1971
[73] Assignee International Standard Electric Corporation
New York, N.Y.
a corporation of Delaware
[32] Priority Nov. 7, 1966
[33] Great Britain
[31] 49721/66

[54] OPTICAL BINARY COUNTER
4 Claims, 7 Drawing Figs.

[52] U.S. Cl. 235/92, 307/220, 307/286, 307/322
[51] Int. Cl. H03k 19/08, H03k 23/36
[50] Field of Search 235/92, 90, 10, 65, 6, 8.1, 8; 307/286, 322, 220

[56] References Cited

UNITED STATES PATENTS

| | | | |
|---|---|---|---|
| 3,234,498 | 2/1966 | Yourke et al. | 307/286 |
| 3,372,289 | 3/1968 | Meyer | 307/286 |

*Primary Examiner*—Maynard R. Wilbur
*Assistant Examiner*—Joseph M. Thesz, Jr.
*Attorneys*—C. Cornell Remsen, Jr., Rayson P. Morris, Percy P. Lantzy, Philip M. Bolton and Isidore Togut

ABSTRACT: A binary counter including at least two digital divide-by-two circuits connected in cascade, each of said digital divide-by-two circuits which provides the means for obtaining one binary units include a thin metal-insulator-metal resistance-memory device having symmetrical voltage-current characteristics, voltage potential means coupled to said resistance-memory device, and an input/output circuit, wherein each of said digital divide-by-two circuits produces N/2 output pulses for N equal amplitude, single polarity input pulses.

Inventor
RONALD W. LOMAX
By Charles L. Johnson Jr.
Attorney

Inventor
RONALD W. LOMAX
By Charles L. Johnson Jr.
Attorney

Inventor
RONALD W. LOMAX
By Charles L. Johnson Jr.
Attorney

OPTICAL BINARY COUNTER

The invention relates to binary counters and in particular to optical binary counters which utilize resistance-memory devices having particular voltage-current characteristics.

The invention provides a binary counter including at least two digital divide-by-two circuits connected in cascade and count resetting means, each of said digital divide-by-two circuits which provide the means for obtaining one binary unit include a resistance-memory device having voltage-current characteristics as hereinafter defined, electrical biasing means for said resistance-memory device and an output circuit, wherein each of said digital divide-by-two circuits produces N/2 output pulses for N equal amplitude, signal polarity input pulses.

According to a feature of the invention there is provided a binary counter as detailed in the preceding paragraph wherein said digital divide-by-two circuits are enclosed in an evacuated envelope together with electroluminescent means, wherein said resistance-memory devices emit electrons when switched into a low conductance state by said input pulses and wherein said electrons cause said electroluminescent means to be illuminated to provide an optical output for said binary counter.

The foregoing and other features according to the invention will be understood from the following description with reference to the accompanying drawings, in which.

Figure 3:
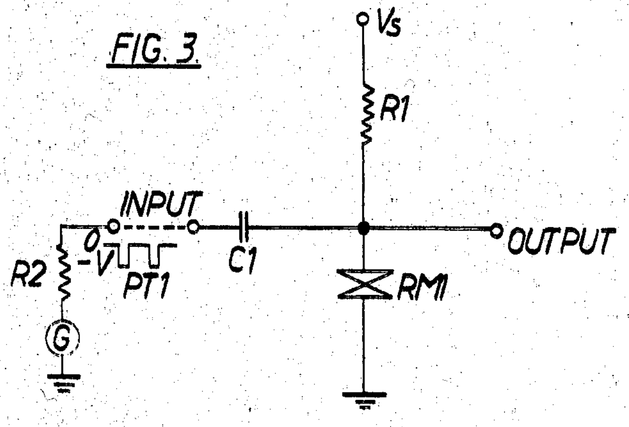
FIG. 3 shows a digital divide-by-two circuit.
Figure 5:
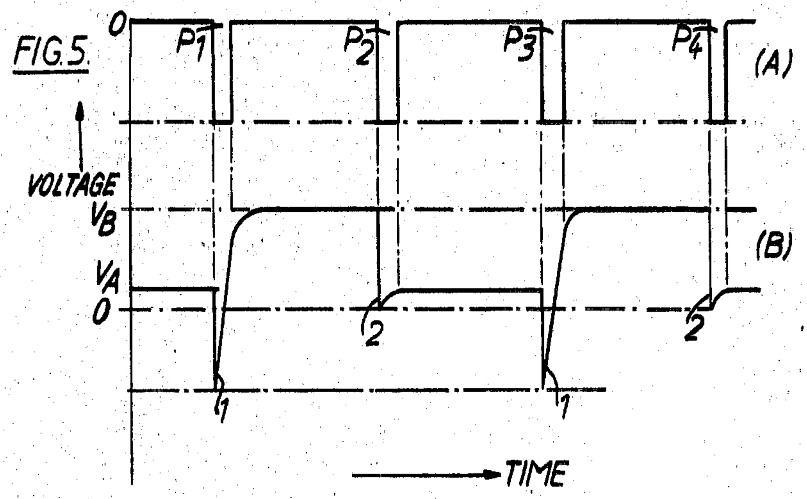
Figure 6:
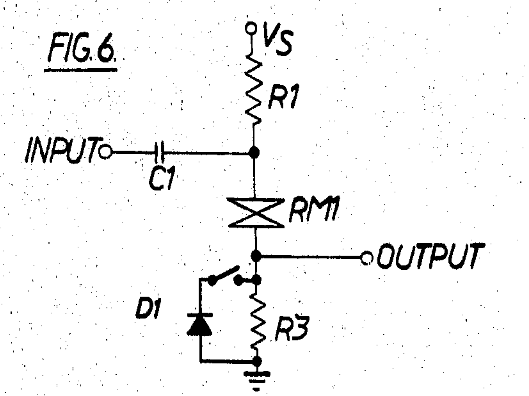
Figure 7:
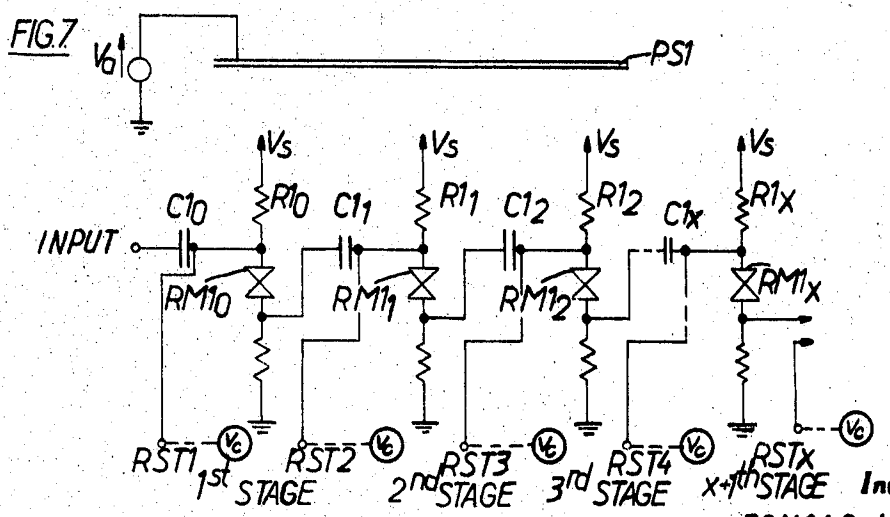

FIG. 5*a* shows an input waveform for the digital divide-by-two circuit shown in the drawing according to FIG. 3;

FIG. 5*b* shows the output waveform for the digital divide-by-two circuit shown in the drawing according to FIG. 3 when the input waveform shown in the drawing according to FIG. 5*a* is applied thereto;

FIG. 6 shows an alternative arrangement for the digital divide-by-two circuit shown in the drawing according to FIG. 3; and FIG. 7 shows the circuit diagram of an optical binary counter according to the invention which utilizes the digital divide-by-two circuits shown in the drawing according to FIG. 6.

The resistance-memory device which is used as the active element in the digital divide-by-two circuit according to the invention is of the type comprising a thin metal-insulator-metal sandwich having symmetrical voltage-current characteristics which are defined as characteristics in which for either a positive or negative increase from zero of the voltage applied to the resistance-memory device, the respective current output increases positively or negatively to a maximum value and then decreases to form a negative resistance region. By increasing the voltage still further the negative resistance region ceases and the current again increases. By slowly decreasing the applied voltage to zero the previous path is retraced but decreasing the applied voltage rapidly to zero causes the current to fall rapidly to zero and the resistance-memory device to be in a high resistance state. The resistance-memory device will remain in the high resistance state until the applied voltage exceeds a predetermined value when the resistance will begin to decrease to its initially low value.

Figure 1:
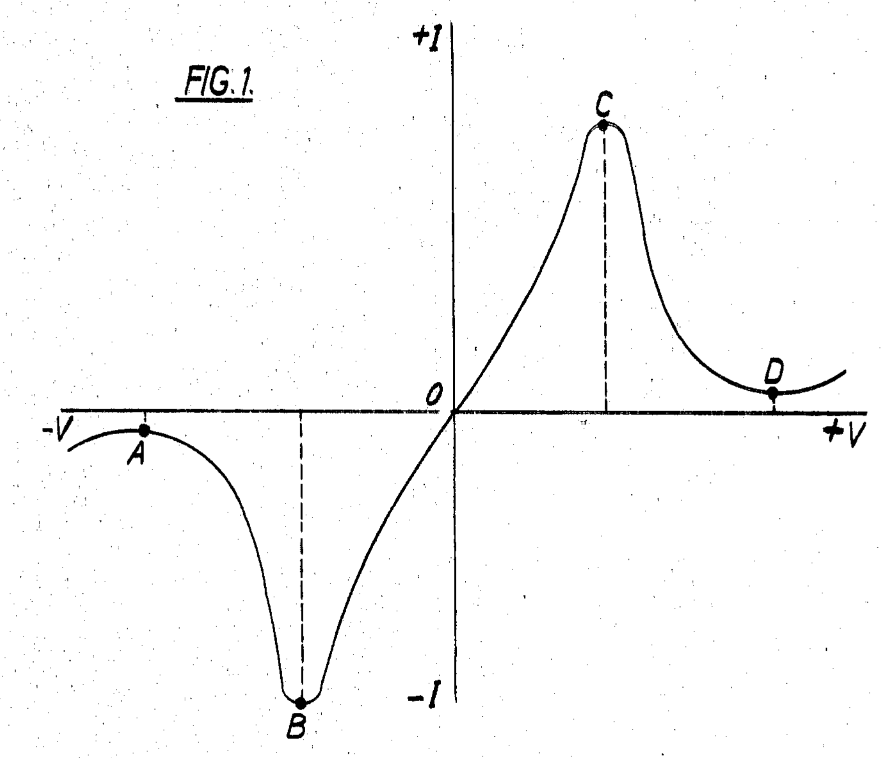
FIG. 1 shows the voltage-current characteristics of a resistance-memory device used as part of a digital divide-by-two circuit.

Referring to FIG. 1, the DC characteristics of the resistance-memory device are represented by the curve ABOCD. If the applied voltage (V) starting from zero, point 0, is increased positively the current (I) increases until the point C is reached. Increasing the voltage further causes the current to decrease and the resistance-memory device in this region behaves as a negative resistance. At the point D on the curve the negative resistance region ceases and the current will increase again. Decreasing the voltage slowly from point D the previous path is retraced, from D to C and then to 0. The resistance-memory device is symmetrical, so if the voltage is increased negatively, from zero, the curve, OBA, will be followed, and as before, if the voltage is reduced slowly from point A the current follows the path, ABO. In a typical device the point C occurs at approximately 3 volts and the point D at about 6 volts.

Figure 2:
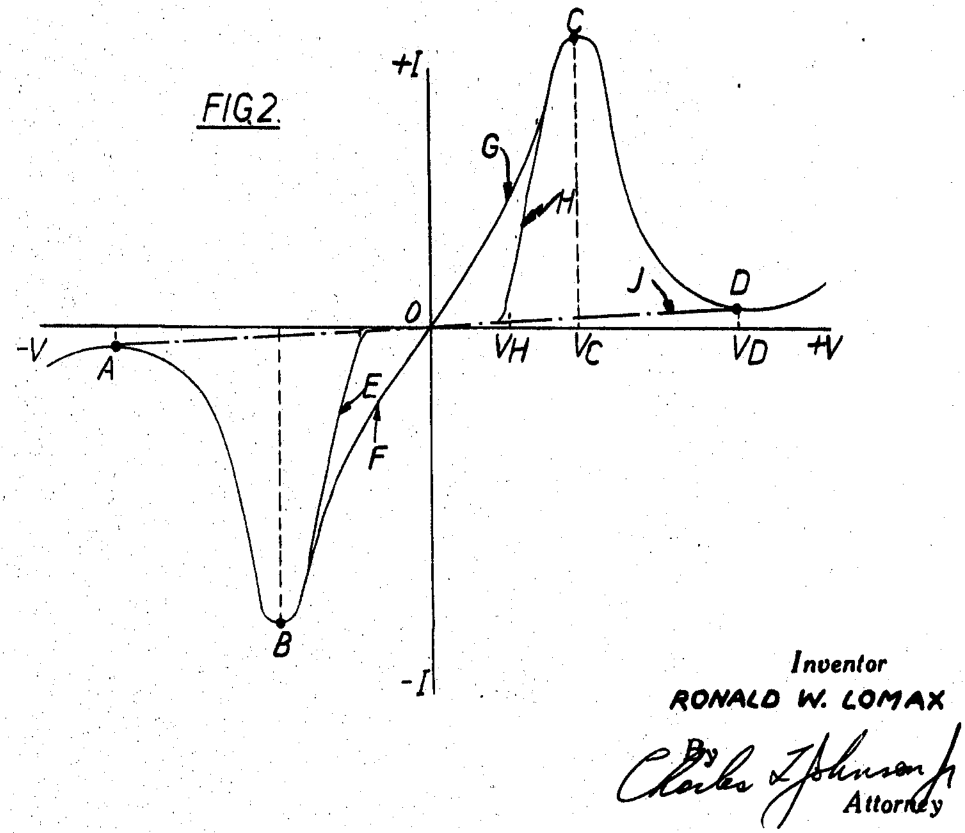
FIG. 2 shows the pulse characteristics of a resistance-memory device used as part of a digital divide-by-two circuit.

The pulse characteristics for the resistance-memory device are altogether different from the DC characteristics. The relevant pulse characteristics are shown in the drawing according to FIG. 2 where, if the voltage is increased positively from zero, the current will follow the curve G to a peak value at C then through the negative resistance region to D. Having reached D, if the voltage is then switched off and allowed to fall to zero quickly, instead of following the path, DCO, as in the DC case, the current falls to zero following the chain dotted curve J. When, after a suitable delay, the voltage is increased again the current will trace out the curve, H, and not the curve G as before.

An alternative way of considering the device pulse characteristics is to assume that the resistance of the resistance-memory device is initially low, then by taking the applied voltage to '$V_D$' and switching it off rapidly will put the resistance-memory device into a high resistance state. It will remain in this high resistance state until the applied voltage exceeds $V_H$, when the resistance will begin to decrease. When the voltage finally reaches the value of $V_C$, the device will be back to its initial low resistance. It is possible to obtain both the high and low resistance states using pulses; a large pulse of amplitude, $V_D$ will put the resistance-memory device into a high resistance state and a smaller pulse, of amplitude $V_C$, will put the resistance-memory device into the low resistance state. The resistance-memory device is completely symmetrical, and it is possible to use a large positive or negative pulse to obtain the high resistance state, and a small negative or positive pulse to change to a low resistance state.

There is one other important characteristic of resistance-memory device to note with regard to the present invention. When the applied voltage, pulse or DC has equalled or exceeded $V_D$, and caused the resistance-memory device to be in the high resistance state, there is a definite relaxation time and therefore a delay before the resistance-memory device can be changed to the low resistance state. Thus, if a large pulse is followed by a small pulse, and the time interval between the pulses is less than the relaxation time, the device will switch to the high resistance state but will not return to the low resistance condition.

Referring to FIG. 3, a digital divide-by-two circuit is shown and comprises a resistance-memory device RM1 which exhibits the characteristics outlined in the preceding paragraphs, a resistance R1 connected between one side of the resistance-memory device RM1 and a DC electrical supply $V_S$, and a capacitance C1 connected between the input terminal and the junction between the resistance R1 and the resistance-memory device RM1. The other side of the resistance-memory device RM1 is connected directly to earth potential and the output from the digital divide-by-two circuit is taken from the junction between the resistance R1 and the resistance-memory device RM1.

The capacitance C1, is only used for decoupling purposes and takes no part in the operation of the digital divide-by-two circuit provided it is large enough to prevent differentiation of the input signal.

The train of negative going input pulse PT1 which are applied to the input terminal of the digital divide-by-two circuit are derived from a suitable source, for example the generator G and series connected resistance R2 shown in the drawing according to FIG. 3.

Figure 4:
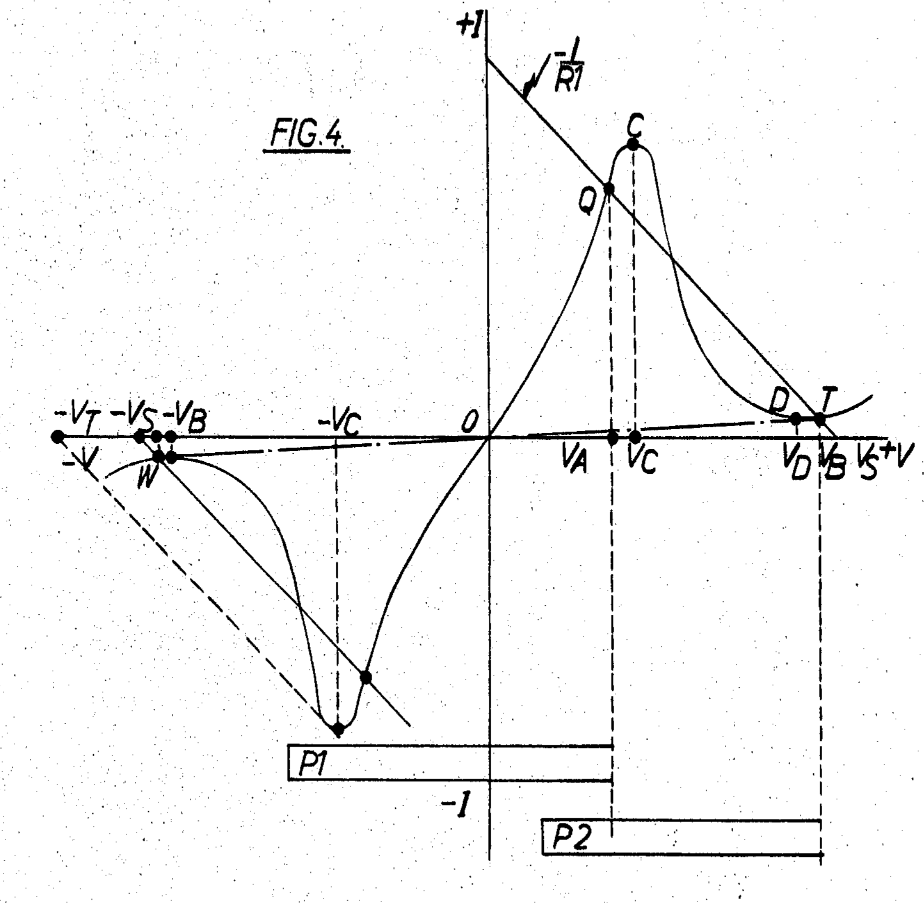
FIG. 4 shows the circuit voltage-current characteristics of the digital divide-by-two circuit shown in the drawing according to FIG. 3.

The operation of the digital divide-by-two circuit will be understood with reference to the drawings according to FIG. 4, 5*A* and 5*b* which show respectively the circuit characteristics and associated waveforms. Starting with the resistance-memory device RM1 in the low resistance or high conductance state and the DC electrical supply $V_S$ positive, the operating point will be at Q on the current-voltage characteristics shown in the drawing according to FIG. 4, and the output voltage will be $+V_A$. A negative pulse, P1 (FIG. 5*a* ), applied at the input terminal of the digital divide-by-two circuit will cause the resistance-memory device RM1 to be in the high resistance or low conductance condition, i.e. it causes the voltage-$V_C$ to be exceeded. When the input pulse ceases, the resistance-memory device cannot return to the low resistance or high conductance state, due to the relatively long relaxation time, discussed previously. The resistance-memory device, therefore, remains in the high resistance or low conductance state, and the operating point finally settles at the point, T, the output voltage being $+V_B$. When the second pulse, P2 (FIG. 5*a* ), arrives, which for convenience would be of the same amplitude as the pulse P1, but could be different, the resistance-memory device will change to the low resistance or high conductance state. The operating point for the circuit will then be back again at Q, and further pulses, P3, P4, etc. will repeat this cycle.

FIG. 5*b* shows the output waveform for the digital divide-by-two circuit shown in the drawing according to FIG. 3 when the train of negative going input pulses shown in the drawing according to FIG. 5*a* are applied thereto and it can be seen that the frequency of the output waveform is half of the frequency of the input waveform.

The operating limits of the amplitude, width and source impedance of the input pulses, will depend on the characteristics of the resistance-memory device RM1. If the relaxation times are long compared with the fall times of the pulses, then short pulses of amplitude $V_A + V_C$ from a low impedance source are adequate. The width of the pulse must be longer than the relaxation time. If on the other hand, the relaxation times are comparable with the pulse fall times, then higher amplitude pulses will be required, for the source impedance must be increased and a pulse amplitude of $V_A + V_C$ is still required at the resistance-memory device RM1. If the source impedance is equal to R1 as shown in the drawing according to FIG. 3, then the pulses must have a value of $V_A + V_T$. With the shorter relaxation time, however, the width of the pulses could be reduced. There is considerable scope for compromise between relaxation times, pulse amplitude, pulse width and source impedance.

It is of course possible to have a DC supply of negative voltage, and to use positive pulses. It is also possible to use both positive and negative pulses, as is usual when using negative-resistance devices for switching purposes, provided the slight differences in characteristics are taken into account.

Referring to FIG. 6, an alternative arrangement for the digital divide-by-two circuit shown in the drawing according to FIG. 3 is shown. This circuit arrangement is exactly the same as the circuit shown in the drawing according to FIG. 3 except a resistance R3 is interposed between the resistance-memory device RM1 and earth potential and the output is taken across the resistance R3. The resistance R3 may have a small value therefore the output is obtained from a constant low impedance source.

It may be necessary in order to achieve optimum operation of the digital divide-by-two circuit shown in the drawing according to FIG. 6 to include in the output circuit suitable means for clipping the spikes 1 and 2 on the output pulses (FIG. 5*b*). This could be achieved for example, by either making resistance R3 a nonlinear resistance, shunting the resistance R3 with a semiconductor diode D1 or replacing the resistance R3 by a semiconductor diode.

Whenever the resistance-memory device RM1 is in the low conduction or high resistance state T as shown in the drawing according to FIG. 4, electrons are emitted from the top positive electrode of the resistance-memory device RM1. When the resistance-memory device RM1 is in the high conduction or low resistance state Q (FIG. 4) no electrons would be emitted therefore by operating the resistance-memory device RM1 in a vacuum at a pressure of several $10^{-5}$ torr together with an electroluminescent screen for example a phosphor screen, preferably but not necessarily located in close proximity to the resistance-memory device and held at a relatively high potential then the electron emission may be observed since the phosphor screen would glow when electrons are emitted and given rise to an optical output for the resistance-memory device thereby giving an indication when the resistance-memory device RM1 is in the low conductance state.

When operated in a vacuum the point C on the curve shown in the drawing according to FIG. 1 occurs for a typical device at approximately 3.5 volts and the point D at approximately 8 volts.

It should be noted that in order to operate the digital divide-by-two circuits in the above mode it is necessary whether using a positive or negative supply voltage for the circuits to ensure that the top electrode of the resistance memory device RM1 is always positive.

The electron emission from the resistance-memory device RM1 and subsequent illumination of an electroluminescent screen is employed in the optical binary counter according to the invention, the circuit diagram of which is shown in the drawing according to FIG. 7.

Referring to FIG. 7, the optical binary counter comprises a digital divide-by-two circuit as shown in the drawing according to FIG. 6 at each of its stages connected in cascade and an electroluminescent screen PS1, for example a phosphor screen, preferably be not necessarily located in close proximity to the resistance-memory devices $RM1_0$, $RM1_1$ and $RM1_2$...$RM1_x$ and held at a relatively high potential by means of the electrical supply V*a* in order to cause the emitted electrons to be accelerated towards the screen PS1. The digital divide-by-two circuits and the electroluminescent screen PS1 would require to be enclosed within an evacuated envelope at a pressure of several $10^{-5}$ torr in order to detect the electron emission by way of the electroluminescent screen PS1. The envelope is not shown in the drawing according to FIG. 7. The terminals RST1, RST2, RST3...RST*x* which are respectively connected to the inputs of 1st, 2nd, 3rd... $x+1^{the}$ stages of the counter provide the means for resetting the counter.

In practice in order to ensure that each stage of the binary counter is inherently similar to provide a stable operating mode, the circuit components C1, R1, R3 and RM1 which form each of the digital divide-by-two circuits of the counter shown in the drawing according to FIG. 7 could be made by thin film vacuum deposition for example, on the same substrate to provide a very simple construction for the binary counter.

It will be appreciated that the optical binary counter shown in the drawing according to FIG. 7 is the simplest form of counter possible, the resistance R3 could be replaced or shunted by a semiconductor diode for the reason outlined in a preceding paragraph.

The units counted at the first stage of the binary counter would be $2^0$, the units counted at the second stage would be $2^1$, the units counted at the third stage would be $2^2$ and the units counted at the $x+1^{th}$ stage would be $2^x$. . Thus it can be seen that the circuit diagram shown in the drawing according to FIG. 7 constitutes a binary counter of the voltage pulses from the digital divide-by-two circuits and when operated in a vacuum together with electroluminescent means would provide a continuous optical readout of the binary count.

Referring to FIG. 7 and considering the voltage $V_s$ at each of the logic element stages to be positive and the stages to be in a high conductance state i.e. no electrons being emitted, then a train of N-negative going input pulses applied to the first stage would produce therefrom a train of N/2-negative going output pulses which are applied to the input of the second stage. The output from the second stage would be a train of N/4-negative going pulses. This successive divide-by-two mode of operation would be carried out at each of the stages as the train of N-negative going input pulses passes through a binary counter.

Since each of the stages of the binary counter are initially considered to be in the high conductance state (point Q on the curve shown in the drawing according to FIG. 4) then each stage will be switch to the low conductance state (point T on the curve shown in the drawing according to FIG. 4) when an odd number of pulses are applied at the input terminal thereof thereby causing electrons to be emitted from the top positive electrode of the resistance-memory device which in turn will cause that part of the electroluminescent means associated therewith to be illuminated. When one pulse is applied to the first stage of the counter the resistance-memory device $RM1_0$ will be switched to the low conductance state and that part of the electroluminescent means associated therewith and representative of the units $2^9$ would be illuminated. However, when five pulses are applied to the first stage of the counter the resistance-memory devices $RM1_0$ and $RM1_3$ will be switched to the low conductance state and those parts of the electroluminescent means associated with these stages and representative respectively of the units $2^0$ and $2^2$ would be illuminated However, when five pulses are applied to the first stage of the counter the resistance-memory devices $RM1_0$ and $RM1_3$ will be switched to the low conductance state and those parts of the electroluminescent means associated with these stages and representative respectively of the units $2^0$ and $2^2$ would be illuminated by virtue of the divide-by-two mode of operation an odd number of pulses would appear at the input terminal of the first and third stages of the binary counter.

At the end of a count the binary counter could be reset to zero by the application of a potential from source $V_C$ of similar size to $V_C$ (FIG. 2) to all of the stages via the terminals RST1, RST2, RST3....RST*x*.

It should be noted that a binary counter may be obtained without the electroluminescent means and the evacuated enclosure by providing pulse indicating means in the output circuit of each stage of the binary counter.

In practice, the electroluminescent screen PS1 may take several forms, the main criteria involved being that each stage of the binary counter should be associated with only one discrete area of the screen.

It is to be understood that the foregoing description of specific examples of this invention is made by way of example only and is not to be considered as a limitation on its scope.

I claim:

1. a binary counter including at least two digital divide-by-two circuits connected in cascade, each circuit producing N/2 output pulses for N equal amplitude signal polarity input pulses, and each circuit comprising:

a thin metal-insulator-metal resistance-memory device having symmetrical voltage-current characteristics which for either a positive or negative increase from zero of the voltage applied to the device, the respective current output increases positively or negatively to a maximum value and then decreases to form a negative resistance region, and said device having a definite relaxation time before it can switch from a high to a low resistance condition;

an input capacitor coupling said input pulses to one terminal of said device;

a first resistor connected between said one terminal and a first voltage potential; and a second resistor connected between another terminal of said device and a ground reference potential, whereby the output of each of said digital circuits is taken from said other terminal of said device.

2. A binary counter according to claim 1 wherein each circuit includes count resetting means, said resetting means comprising a second voltage potential coupled to said one terminal to reset said device from a high to a low resistive condition when required.

3. A binary counter according to claim 2 including means for clipping voltage spikes from the output of said device, said clipping means comprising a semiconductor diode shunting said second resistor.

4. A binary counter according to claim 2 wherein said second resistor is a nonlinear resistance adapted for clipping voltage spikes from the output of said device.